July 22, 1941.   O. HACKER   2,250,372
DRIVE OF MOTOR VEHICLES
Filed April 30, 1938

O. Hacker
INVENTOR
By: Glascock Downing & Seebold
ATTYS.

Patented July 22, 1941

2,250,372

UNITED STATES PATENT OFFICE 2,250,372

DRIVE OF MOTOR VEHICLES

Oskar Hacker, Steyr, Germany, assignor to the firm Steyr-Daimler-Puch A. G., Steyr, Austria Application April 30, 1938, Serial No. 205,343
In Austria May 15, 1937

1 Claim. (Cl. 180—22)

This invention relates to a drive arrangement for the rear wheels of six wheel motor vehicles, which are mounted on each side of the vehicle in a common swingable wheel carrier and are driven independently of each other by bevel gears, each wheel carrier on one side being rotatable independently of the wheel carrier on the other side around a swinging axis located between the wheel carriers.

In the usual drive arrangements, that is to say, in the case of six wheel motor vehicles having pairs of rear wheels mounted on swinging wheel carriers on each side of the vehicle and driven by bevel gears, there is the disadvantage that the forward rear wheels in the direction of travel may easily rise or rear up under the action of the driving torque, whereby the steering and guiding of such vehicles is rendered exceedingly difficult.

The present invention is based on the discovery that in the arrangment of such wheels one behind the other upon a common wheel carrier, which is rotatably mounted on a swinging axis between the wheels, a remedy for this drawback can be provided by making the distance of the one wheel from the swinging axis of the swinging wheel carrier smaller, in accordance with the invention, than the distance of the other wheel from the said axis. By this means, the static load is transmitted in unequal amounts to the wheels and the wheel which is inclined to rear up is more heavily loaded, thereby counteracting any rearing action. If the forward wheel of the pair arranged one behind the other in the direction of travel of the vehicle is arranged upon the swinging wheel carrier at a smaller distance from the swinging axis of the swinging wheel carrier than the rear wheel, then the forward wheel will be more heavily loaded and the rearing up of the front wheel can be counteracted to any desired extent by means of such an arrangement with unequal lever arms, so that it is possible by means of such unequal lever arms to produce an action such that the rearing up of the forward wheel will be prevented.

Figure 1:
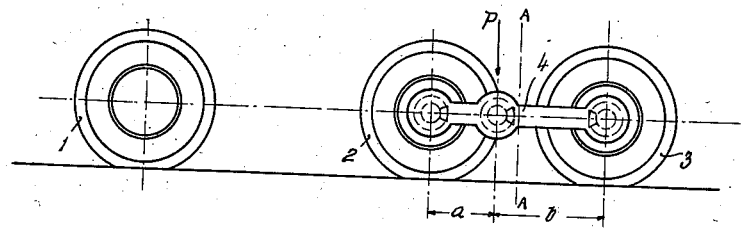
Figure 2:
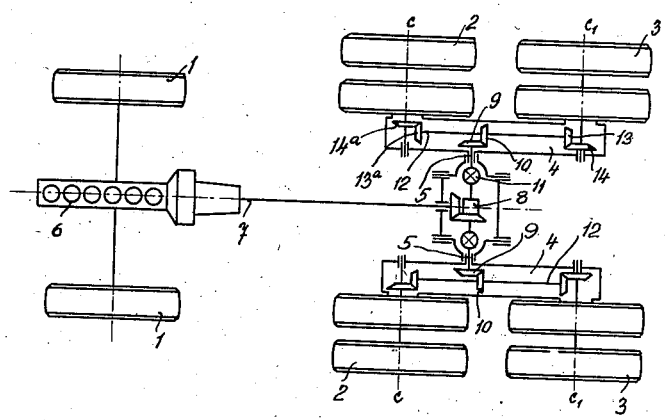
Figure 3:
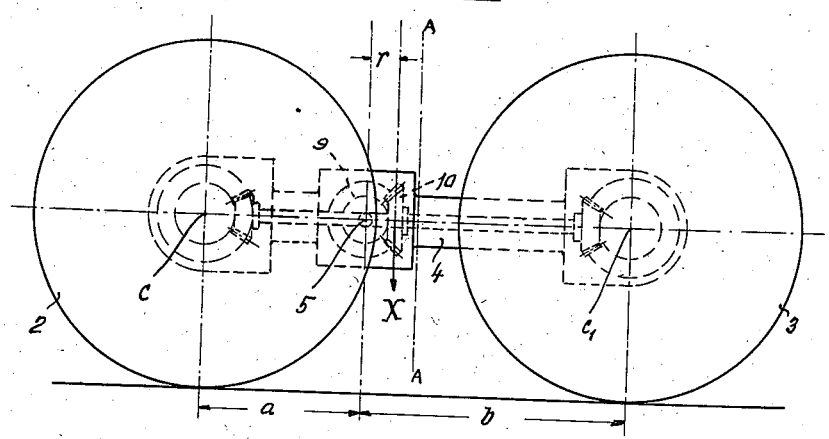

Figs. 1 and 2 of the accompanying drawing show diagrammatically a complete arrangement for a six-wheeled vehicle, while Fig. 3 shows the arrangement according to the invention on a larger scale.

Referring to the drawing, in the six-wheeled vehicle with the front wheels 1 and the pairs of rear wheels 2, 3 arranged one behind the other on each side of the vehicle, the said rear wheels are mounted, one pair on each side of the vehicle, one behind the other, on a swinging wheel carrier 4 which is rotatably mounted so as to be capable of swinging about a swinging axis 5 between the wheels 2, 3. The rear wheels 2, 3 on each side of the vehicle are driven independently, namely in the constructional example shown in the drawing by way of example, from the motor 6 mounted at the front and through the cardan shaft 7 or the like and through the intermediary of a differential gear or the like 8. Transverse shafts 5 are driven from the differential gear or the like through universal joints 11, the motion being transmitted from the shafts 5 through bevel gears 9, 10 and longitudinal shafts 12 on each side of the vehicle, which drive the wheel axles $c$, $c_1$ on which the rear wheels 2, 3 are mounted, through bevel gears 13, 14 and 13a, 14a, respectively.

In the constructional example shown in the drawing, the swinging wheel carrier 4 is mounted so as to swing about a swinging axis 5 which lies outside of the middle A—A of the wheel carrier, the distance $a$ of the swinging axis from the front wheel 2 in the direction of travel being smaller than the distance $b$ of the rear wheel 3 from the swinging axis.

When the vehicle is being driven, a force X (Fig. 3) is exerted by the driving bevel gear 9 of the cross shaft 5 upon the bevel gear 10 which transmits the drive to the wheels. By means of this force X, a moment X.$r$ is set up which acts on the wheel carrier in the clockwise direction, $r$ being the distance between the axis of the cross shaft 5 and the point of engagement between the teeth of the bevel gears at which the force X acts, that is to say the distance of the said point of engagement from the pivotal axis of the wheel carrier 4. By means of this moment X.$r$ acting on the wheel carrier, an additional load is applied to the rear wheel 3 and the forward wheel 2 is relieved of a corresponding load.

In the usual arrangements, in which the central drive is arranged at the axis of symmetry A—A of the wheel carrier, the resulting rearing-up moment produces a reduction of the adhesion of the forward wheel to the ground and may, for example when climbing uphill, cause the forward wheel to rise.

By arranging the swinging axis of the swinging wheel carrier 4 closer to the forward wheel 2, the total load P is transmitted to the wheels 2 and 3 in unequal amounts. Corresponding to the short lever arm $a$ of the carrier the greater part of the load P acts on the wheel 2, while, corresponding to the longer lever arm $b$ of the swinging carrier, the smaller part of the load acts on the wheel 3. By thus non-uniformly loading the wheels, owing to the unequal distances $a$ and $b$ of the pivotal axis of the swinging wheel carrier from the wheels, the rearing-up of the forward wheel can be counteracted to such an extent that rising can be prevented. By suitable choice of the lengths of the levers $a$ and $b$ the rearing action may also be entirely balanced out and the result obtained that both wheels 2 and 3 exert the same pressure upon the ground and equal adhesion will be obtained.

What I claim is:

In a motor vehicle, rear drive wheels arranged one behind the other in pairs on each side especially of six wheel motor vehicles, a carrier for each pair of wheels, means mounting each carrier to swing about an axis located between the wheels, a longitudinal shaft in each carrier forming a driving connection between the related pair of wheels, a drive shaft for each pair of wheels disposed substantially coaxial with the swinging axis, and an independent bevel gear drive for the wheels at each side of the vehicle and connecting the longitudinal and drive shafts each carrier being movable about said axis independently of the carrier at the other side of the vehicle and the distance between the swinging axis and the axis of rotation of the foremost rear wheel of each pair in the direction of travel being less than the distance between the swinging axis and the axis of rotation of the rearmost rear wheel whereby lifting of the foremost rear wheel in the direction of travel effected by the bevel gear drive is avoided by the greater load of the foremost rear wheel, so that substantially the same tractive effort is exerted by all of the rear wheels.

OSKAR HACKER.